(12) United States Patent
Maeda et al.

(10) Patent No.: US 7,769,083 B2
(45) Date of Patent: Aug. 3, 2010

(54) IMAGE PROCESSING AND TRANSMISSION USING HIGH AND LOW COMPRESSION RATIOS DEPENDING ON IMAGE CHANGE CONDITIONS

(75) Inventors: Tsuyoshi Maeda, Hyogo (JP); Takashi Watanabe, Osaka (JP)

(73) Assignee: Panasonic Corporation, Osaka (JP)

( * ) Notice: Subject to any disclaimer, the term of this patent is extended or adjusted under 35 U.S.C. 154(b) by 1264 days.

(21) Appl. No.: 10/561,083

(22) PCT Filed: Mar. 10, 2004

(86) PCT No.: PCT/JP2004/003053

§ 371 (c)(1),
(2), (4) Date: Dec. 16, 2005

(87) PCT Pub. No.: WO2004/114674

PCT Pub. Date: Dec. 29, 2004

(65) Prior Publication Data

US 2007/0098082 A1    May 3, 2007

(30) Foreign Application Priority Data

Jun. 19, 2003    (JP) ............................. 2003-174331

(51) Int. Cl.
*G06T 9/00* (2006.01)
*H04N 7/12* (2006.01)
(52) U.S. Cl. ............................. 375/240.02; 375/240.06; 382/239
(58) Field of Classification Search ............ 375/240.02, 375/240.04, 240.06, 240.12, 240.13; 382/236, 382/237, 239
See application file for complete search history.

(56) References Cited

U.S. PATENT DOCUMENTS

| | | | |
|---|---|---|---|
| 4,729,035 A * | 3/1988 | Tanioka | 382/237 |
| 6,415,058 B2 * | 7/2002 | Grohs et al. | 382/239 |
| 6,501,853 B1 | 12/2002 | Gregg et al. | |
| 6,678,324 B1 | 1/2004 | Yamauchi | |
| 7,561,749 B2 * | 7/2009 | Tamura et al. | 382/239 |
| 2002/0172418 A1 | 11/2002 | Hu | |

FOREIGN PATENT DOCUMENTS

EP    1 235 185 A2    8/2002

(Continued)

OTHER PUBLICATIONS

Sullivan, et al., "Rate-Distortion Optimization for Video Compression," IEEE Signal Processing Magazine, IEEE Service Center, vol. 15, No. 6, Nov. 1, 1998, pp. 74-90.

(Continued)

*Primary Examiner*—Scott A Rogers
(74) *Attorney, Agent, or Firm*—RatnerPrestia

(57) ABSTRACT

In an image processing method of sequentially loading, compressing, and transmitting images to thereby display the images, there is provided the image processing method capable of preventing the images from degradation while keeping the responsibility until the image is displayed. When a changed region is determined to be present, the image is compressed using a method with a high compression ratio, while when there is no changed region and a predetermined period of time elapses, the image is determined to be static to thereby be compressed using a method with a low compression ratio and very little distortion.

30 Claims, 11 Drawing Sheets

FOREIGN PATENT DOCUMENTS

| | | |
|---|---|---|
| JP | 06-178286 | 6/1994 |
| JP | 06-268997 | 9/1994 |
| JP | 09-084022 | 3/1997 |
| JP | 09-098432 | 4/1997 |
| JP | 09-098433 | 4/1997 |
| JP | 10-145796 | 5/1998 |
| JP | 11-205796 | 7/1999 |
| JP | 2001-036655 | 2/2001 |

OTHER PUBLICATIONS

Vass, et al., "Interactive Image Retrieval Over the Internet," Reliable Distributed Systems, 1998, Proceedings, Seventeenth IEEE Symposium, IEEE Comput. Soc. US, Oct. 20, 1998, pp. 461-466.

Supplementary European Search Report for Application No. EP 04 71 9047, dated Feb. 1, 2010.

International Search Report for application No. PCT/JP2004/003053 dated Jun. 22, 2004.

* cited by examiner

IMAGE PROCESSING AND TRANSMISSION USING HIGH AND LOW COMPRESSION RATIOS DEPENDING ON IMAGE CHANGE CONDITIONS

THIS APPLICATION IS A U.S. NATIONAL PHASE APPLICATION OF PCT INTERNATIONAL APPLICATION PCT/JP2004/003053.

TECHNICAL FIELD

The present invention relates to a transmitting apparatus, an image processing system, an image processing method, a program, and a storage medium of compressing an image generated by an image generating apparatus.

BACKGROUND ART

Conventionally, there have been proposed image processing methods of transmitting an image by dynamically changing a compressing method depending on image information or a condition of communication paths. The known methods include, for example, a method described in Japanese Unexamined Patent Publication (Kokai) No. H10-145796, pages 9 and 10 (first method). The entire disclosure of Japanese Unexamined Patent Publication (Kokai) No. H10-145796 is incorporated herein by reference in its entirety.

First, the first method will be explained. FIG. 11 shows a coding apparatus 101 employing the first method. The coding apparatus 101 includes switches SW1 and SW2 of switching compressing methods, a predictive coder 102, a variable length coder 103, and an MPEG coder 104.

According to this method, a movable region is first detected within an image read from a memory. Next, performing histogram processing to the detected region, it is determined whether or not the image is similar to a natural image, and based on the determination result, the switches SW1 and SW2 are then switched. As a result of this, the dynamic image can be MPEG-coded by the MPEG coder 104, while the other types of images may be compressed by the predictive coder 102 and the variable length coder 103.

Japanese Unexamined Patent Publication (Kokai) No. 2001-36655 describes the invention of calculating data transmission speed on a network when image data is transmitted via the network to downsize the image data to be transmitted based on the calculated data transmission speed (second method). The entire disclosure of Japanese Unexamined Patent Publication (Kokai) No. 2001-36655 is incorporated herein by reference in its entirety. According to this invention, it is described the method of resizing the image data or varying a compression ratio so that the transmission time may be kept constant by reducing a data amount.

In the case of the first method, since histogram is used to determine whether or not the detected moving region is similar to the natural image, it takes a certain amount of time to determine the natural image region, and in addition to that, the determination is frequently mistaken, resulting in difficulty in achieving high-speed. Meanwhile, in the case of the second method, since the image compression ratio is changed according to the transmission speed, high-speed transmission has been able to be achieved, but the method has been disadvantageous since image distortion has often occurred due to the change in the compression ratio regardless of image characteristics.

As a result, there still remain problems that to achieve the high-speed transmission is difficult, and the image distortion is likely to occur even if the high speed transmission is established.

DISCLOSURE OF THE INVENTION

In view of the foregoing problems, the present invention aims at providing a transmitting apparatus, an image processing system, an image processing method, a program, and a storage medium of compressing an image smaller in volume at high speed while preventing the image from degradation.

The first aspect of the present invention is a transmitting apparatus comprising:

change detection means of detecting whether an image to be processed is changed exceeding a predetermined criterion;

compression means including a time management means of managing a predetermined time, wherein the compression means compresses said image so that a compression degree may be higher when a detection result by said change detection means indicates that said image is changed exceeding said predetermined criterion, and when the case where the detected result by said change detection means indicates that said image is not changed exceeding said predetermined criterion elapsed by said predetermined time, compresses said image so that the compression degree may become lower; and output means of outputting said compressed image.

The second aspect of the present invention is the transmitting apparatus according to the first aspect of the present invention, wherein said image to be processed is temporarily stored in an image memory, and said change detection means periodically reads said image from said image memory to compare said before and after images, and detects whether said image to be processed is changed exceeding said predetermined criterion.

The third aspect of the present invention is the transmitting apparatus according to the first aspect of the present invention, wherein said predetermined criterion is the number of pixels changed between said before image and said after image.

The fourth aspect of the present invention is the transmitting apparatus according to the first aspect of the present invention, wherein said predetermined criterion is a level by which to determine that said image has not been changed, if said region where the image is changed is smaller than a predetermined size in area, and is in the same position as the previously detected region where the image was changed.

The fifth aspect of the present invention is the transmitting apparatus according to the first aspect of the present invention, wherein said compression means compresses said image by changing the compression ratio of said image according to a degree of change in said image detected by said change detection means.

The sixth aspect of the present invention is the transmitting apparatus according to the first aspect of the present invention, wherein while said image is not changed, except for every predetermined period, said compression means does not compress said image and said output means does not output said image, and said compression means compresses said image at every predetermined period and said output means outputs said image at every predetermined period.

The seventh aspect of the present invention is the transmitting apparatus according to the sixth aspect of the present invention, wherein said compression means does not compress said image when said predetermined period is repeated for a predetermined number of times or more, and said output means does not output said image when said predetermined period is repeated for said predetermined number of times or more.

The eighth aspect of the present invention is the transmitting apparatus according to the seventh aspect of the present invention, wherein when compressing said image at said every predetermined period, said compression means compresses said image to be compressed later at a compression ratio lower than a compression ratio of said image compressed earlier.

The ninth aspect of the present invention is the transmitting apparatus according to the first aspect of the present invention, wherein said image to be processed is that generated by an image signal generating apparatus, and said image signal generating apparatus is a personal computer.

The tenth aspect of the present invention is the transmitting apparatus according to the first aspect of the present invention, wherein for each of a plurality of blocks into which said image that is generated by said image signal generating apparatus is zone-divided, said change detection means detects whether said image to be processed is changed exceeding said predetermined criterion, and for every said block in which it has been detected whether said image to be processed is changed exceeding said predetermined criterion, said compression means compresses said image so that the compression degree may become higher when said detection result by said change detection means indicates that said image is changed exceeding said predetermined criterion elapsed by said predetermined time, compresses said image so that the compression degree may become lower when said detection result by said change detection means indicates that said image is changed not exceeding said predetermined criterion.

The eleventh aspect of the present invention is an image processing system comprising:

an image signal generating apparatus of generating an image;

a transmitting apparatus including change detection means of detecting whether said image to be processed that is generated by said image signal generating apparatus is changed exceeding a predetermined criterion, compression means of compressing said image so that a compression degree may be higher when said detection result by said change detection means indicates that said image is changed exceeding said predetermined criterion, and when said detection result by said change detection means indicates that said image is changed not exceeding said predetermined criterion elapsed by said predetermined time, compressing said image so that the compression degree may become lower, and transmission means of transmitting said compressed image, wherein said compression means comprises a time management means of managing said predetermined time; and a receiving apparatus including expanding means of expanding said transmitted image utilizing information regarding compression of said image by said compression means, and output means of outputting said expanded image.

The twelfth aspect of the present invention is the image display system according to the eleventh aspect of the present invention, wherein said transmitting apparatus also serves as said image signal generating apparatus, and said transmitting apparatus and said image signal generating apparatus are a personal computer.

The thirteenth aspect of the present invention is the image processing system according to the eleventh aspect of the present invention, wherein said receiving apparatus is a projector.

The fourteenth aspect of the present invention is an image processing method comprising:

change detection step of detecting whether an image to be processed is changed exceeding a predetermined criterion;

compression step including a time management step of managing a predetermined time, wherein the compression step compresses said image so that a compression degree may become higher when a detection result by said change detection step indicates that said image is changed exceeding said predetermined criterion, and when said detection result by said change detection step indicates that said image is changed not exceeding said predetermined criterion elapsed by said predetermined time, compressing said image so that compression degree may become lower; and output step of outputting said compressed image.

The fifteenth aspect of the present invention is a recording medium storing a program of causing a computer to function, in the transmitting apparatus according to the first aspect of the present invention, as:

change detection means of detecting whether an image to be processed is changed exceeding a predetermined criterion;

compression means including a time management means of managing a predetermined time, wherein the compression means compresses said image so that a compression degree may become higher when a detection result by said change detection means indicates that said image is changed exceeding said predetermined criterion, and when said detection result by said change detection means indicates that said image is changed not exceeding said predetermined criterion elapsed by said predetermined time, compresses said image so that compression degree may become lower; and output means of outputting said compressed image, wherein said recording medium is computer processable.

The sixteenth aspect of the present invention is a recording medium storing the program according to the fifteenth aspect of the present invention, wherein said recording medium is computer processable.

The seventeenth aspect of the present invention is a transmitting apparatus including change detection means of detecting whether an image to be processed is changed exceeding a predetermined criterion, compression means of compressing said image so that the compression degree of a predetermined rectangular region including the changed region may become higher when a detected result by said change detection means indicates that said image is changed exceeding said predetermined criterion, and when the detected result by said change detection means indicates that said image is not changed exceeding said predetermined criterion, of compressing said image so that a compression degree of a rectangular region including all of said rectangular regions among former images than said image may become lower, output means of outputting said image in the predetermined rectangular region including the changed region when the detected result by said change detection means indicates that said image is changed exceeding said predetermined criterion, and when the detected result by said change detection means indicates that said image is not changed exceeding said predetermined criterion, of outputting said image in said rectangular region including all of said rectangular regions.

The eighteenth aspect of the present invention is a transmitting apparatus according to the seventeenth aspect of the present invention, wherein said image to be processed is temporarily stored in an image memory, and said change detection means periodically reads said image from said image memory to compare said before and after images, and detects whether said image to be processed is changed exceeding said predetermined criterion.

The nineteenth aspect of the present invention is a transmitting apparatus according to the seventeenth aspect of the present invention, wherein said predetermined criterion is the number of pixels changed between said before and after images.

The twentieth aspect of the present invention is a transmitting apparatus according to the seventeenth aspect of the present invention, wherein said predetermined criterion is used to determine that said image is not changed, if the region where said image is changed is smaller than a predetermined size in area, and is in the same position as the previously detected region where said image is changed.

The twenty-first aspect of the present invention is the transmitting apparatus according to the seventeenth aspect of the present invention, wherein said compression means compresses said image by changing compression ratio of said image according to a degree of change in said image detected by said change detection means.

The twenty-second aspect of the present invention is the transmitting apparatus according to the seventeenth aspect of the present invention, wherein during said image is not changed, except for every predetermined period, said compression means does not compress said image and said output means does not output said image, and said compression means compresses said image at every predetermined period and said output means outputs said image at said every predetermined period.

The twenty-third aspect of the present invention is the transmitting apparatus according to the twenty-second aspect of the present invention, wherein when said predetermined period is repeated for the predetermined number of times or more, said compression means does not compress said image, and when said predetermined period is repeated for said predetermined number of times or more, said output means does not output said image.

The twenty-fourth aspect of the present invention is the transmitting apparatus according to the twenty-third aspect of the present invention, wherein when compressing said image at said every predetermined period, said compression means compresses said image to be compressed later at a compression ratio lower than a compression ratio of said image to be compressed earlier.

The twenty-fifth aspect of the present invention is the transmitting apparatus according to the seventeenth aspect of the present invention, wherein said image to be processed is one that is generated by an image signal generating apparatus, and said image signal generating apparatus is a personal computer.

The twenty-sixth aspect of the present invention is the transmitting apparatus according to the seventeenth aspect of the present invention, wherein for each of a plurality of blocks into which said image that is generated by said image signal generating apparatus is zone-divided, said change detection means detects whether said image to be processed is changed exceeding said predetermined criterion, and for said every block in which said image to be processed is detected to be changed exceeding said predetermined criterion, said compression means compresses said image so that the compression degree of the predetermined rectangular region including said changed region may become higher, and compresses said image so that the compression degree of a region other than said rectangular region may become lower.

The twenty-seventh aspect of the present invention is an image processing system including, an image signal generating apparatus of generating an image, a transmitting apparatus including change detection means of detecting whether the image to be processed, which is generated by said image signal generating apparatus, is changed exceeding a predetermined criterion, compression means of compressing said image so that a compression degree of the predetermined rectangular region including said changed region may become higher when the detected result by said change detection means indicates that said image is changed exceeding said predetermined criterion, and when the detected result by said change detection means indicates that said image is not changed exceeding said predetermined criterion, of compressing the image so that a compression degree of a rectangular region including all of the rectangular regions among former images than said image may become lower, and output means of outputting said image in the predetermined rectangular region including said changed region when the detected result by said change detection means indicates that said image is changed exceeding said predetermined criterion, and when the detected result by said change detection means indicates that said image is not changed exceeding said predetermined criterion, of outputting said image in said rectangular region including all of said rectangular regions, a receiving apparatus including expanding means of expanding said transmitted image utilizing information regarding compression of said image by said compression means, and output means of outputting said expanded image.

The twenty-eighth aspect of the present invention is the image processing system according to the twenty-seventh aspect of the present invention, wherein said transmitting apparatus also serves as said image signal generating apparatus, and said transmitting apparatus and said image signal generating apparatus are a personal computer.

The twenty-ninth aspect of the present invention is the image processing system according to the twenty-seventh aspect of the present invention, wherein said receiving apparatus is a projector.

The thirtieth aspect of the present invention is an image processing method including, a detection step of detecting whether an image to be processed is changed exceeding a predetermined criterion, a compression step of compressing said image so that a compression degree of the predetermined rectangular region including said changed region may become higher, when the detected result by said change detection means indicates that said image is changed exceeding said predetermined criterion, and when the detected result by said change detection means indicates that said image is not changed exceeding said predetermined criterion, compressing said image so that a compression degree of a rectangular region including all of said rectangular regions among former images than said image may become lower, and an output step of outputting said image in the predetermined rectangular region including said changed region when the detected result by said change detection means indicates that said image is changed exceeding said predetermined criterion, and when the detected result by said change detection means indicates that said image is not changed exceeding said predetermined criterion, outputting said image in said rectangular region including all of said rectangular regions.

The thirty-first aspect of the present invention is a recording medium of storing the program of causing the computer to function, in the transmitting apparatus according to the seventeenth aspect of the present invention, as:

change detection means of detecting whether an image to be processed is changed exceeding a predetermined criterion, compression means of compressing said image so that a compression degree of the predetermined rectangular region including said changed region may become higher, when the detected result by said change detection means indicates that said image is changed exceeding said predetermined criterion, and when the detected result by said change detection means indicates that said image is not changed exceeding said predetermined criterion, of compressing the image so that a compression degree of a rectangular region including all of said rectangular regions among former images than said image may become lower, output means of outputting said image in the predetermined rectangular region including said changed region when the detected result by said change detection means indicates that said image is changed exceeding said predetermined criterion, and when the detected result by said change detection means indicates that said image is not changed exceeding said predetermined criterion, outputting said image in said rectangular region including all of said rectangular regions, wherein the recording medium is computer processable.

DESCRIPTION OF THE REFERENCE NUMERALS

Figure 1:
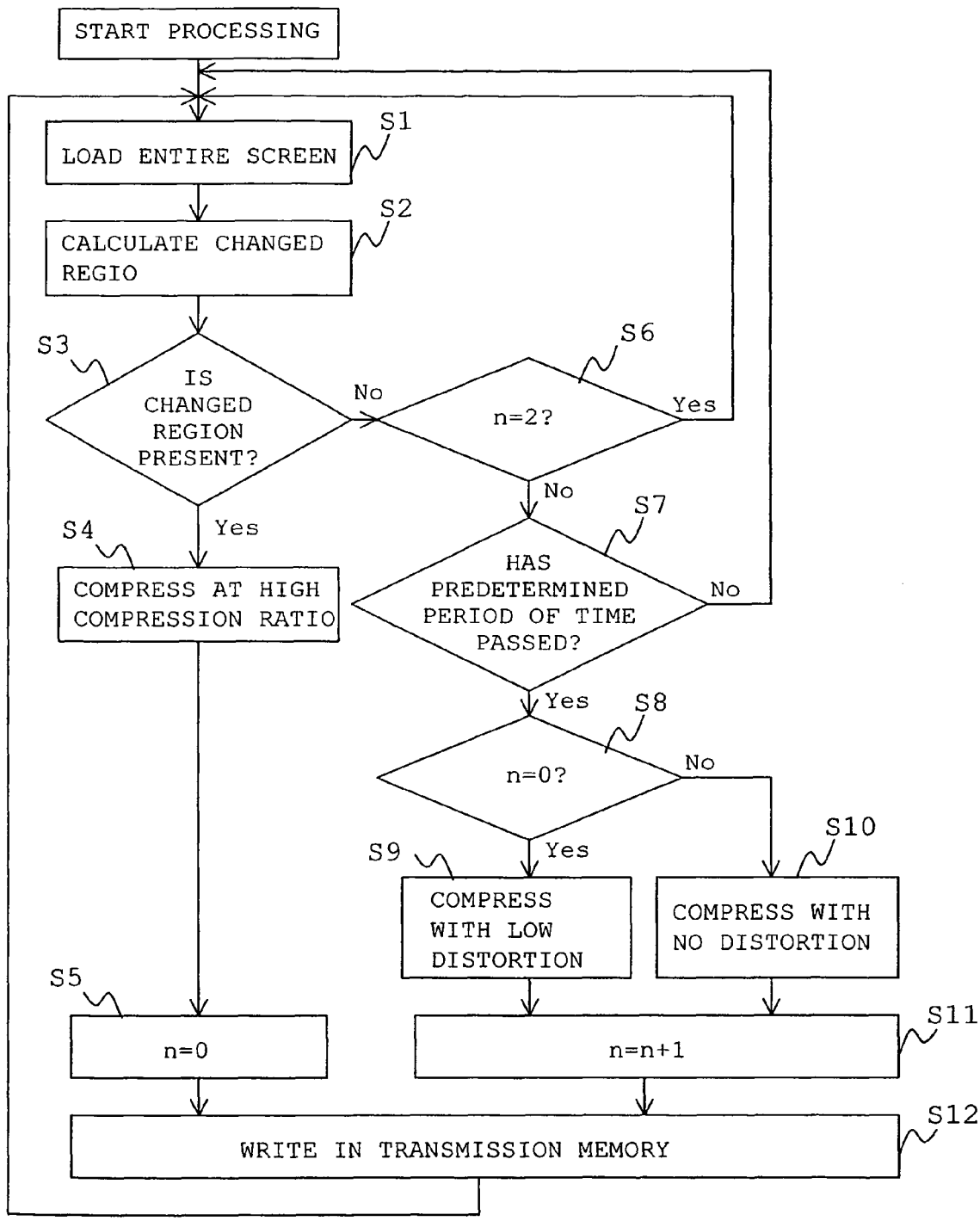
FIG. 1 is a flowchart illustrating an operation of an image processing method according to a first embodiment of the present invention.

11: CPU
12: bus line
13: memory
14: display
15: input section
16: graphic adapter
21: whole PC screen
22: changed region
31: projector
32: screen
33: personal computer (PC)
34: wireless LAN transceiver
41: image loading means
42: updated region calculating means
43: compressing method selecting means
44: updating region retrieving means
45: time management means
46: input device
47: image compression means
48: image information transmitting means
49: compressed image transmitting means
50: image information receiving means
51: compressed image receiving means
52: image expanding means
53: previous screen updating means
54: display means

DETAILED DESCRIPTION OF THE PREFERRED EMBODIMENTS

Hereinbelow, embodiments according to the present invention will be explained with reference to the drawings.

First Embodiment

Figure 2:
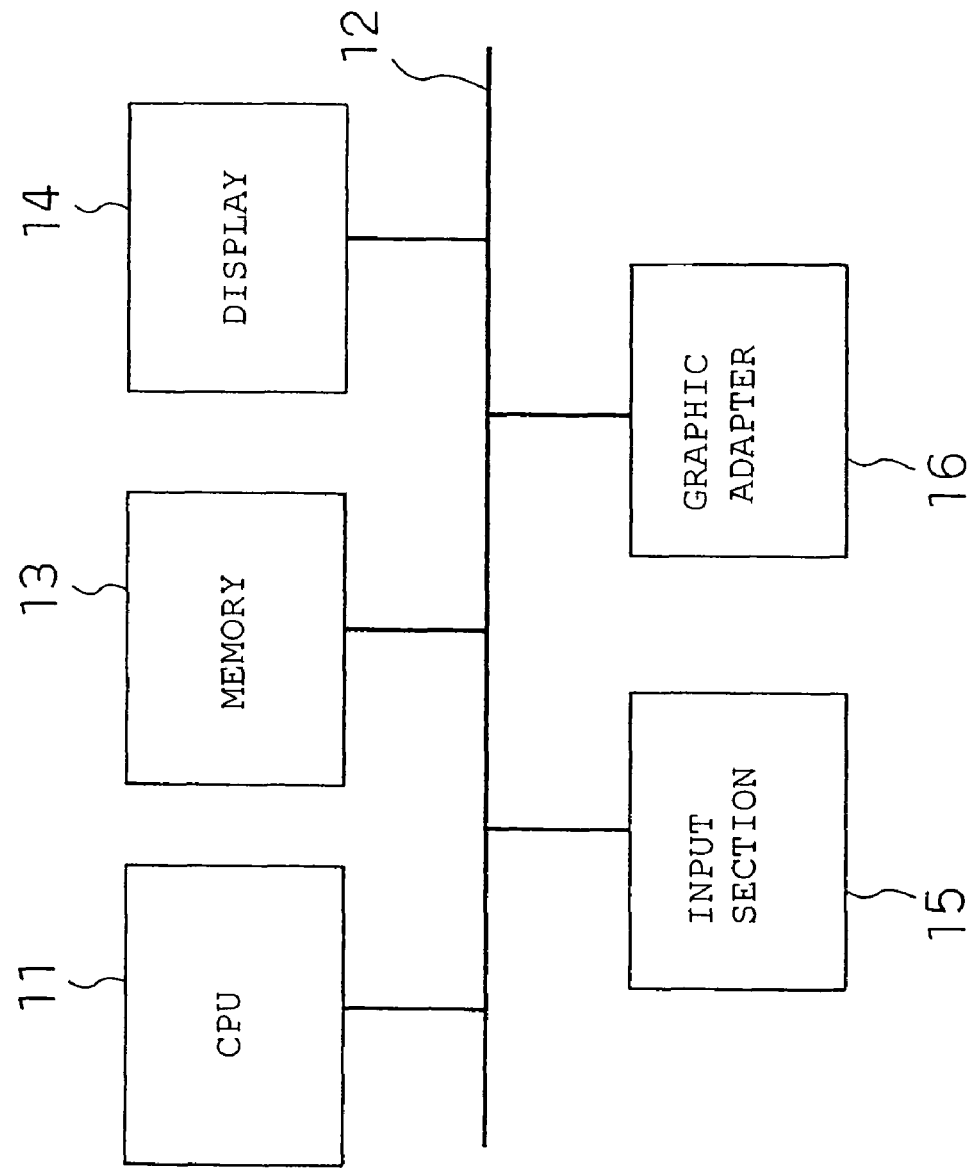
FIG. 2 is a block diagram illustrating an image processing device performing the first embodiment of the present invention.

An image processing method according to a first embodiment according to the present invention will be explained. In this embodiment, images displayed on a screen of a personal computer (hereinbelow, referred to as PC) are intended to be consecutively loaded and compressed. FIG. 2 is a block diagram illustrating an image processing device of the present embodiment, while FIG. 3 schematically illustrates a PC screen.

In FIG. 2, a CPU 11 is connected to a bus line 12. A memory 13 and a display 14, as well as an input section 15 and a graphic adapter 16, are connected to the bus line 12 to constitute the image processing device.

Next, an image processing method of the present embodiment will be explained in detail with reference to a flowchart shown in FIG. 1. At Step S1, contents of the whole PC screen are loaded into the memory in the PC. The contents of the whole PC screen are temporarily stored in an image memory (frame buffer or GRAM) and the image is periodically read therefrom. At Step S2, the loaded contents of the whole screen are compared with the previously loaded contents and coordinates of changing points are calculated to thereby determine a changed region in the screen.

Figure 3:
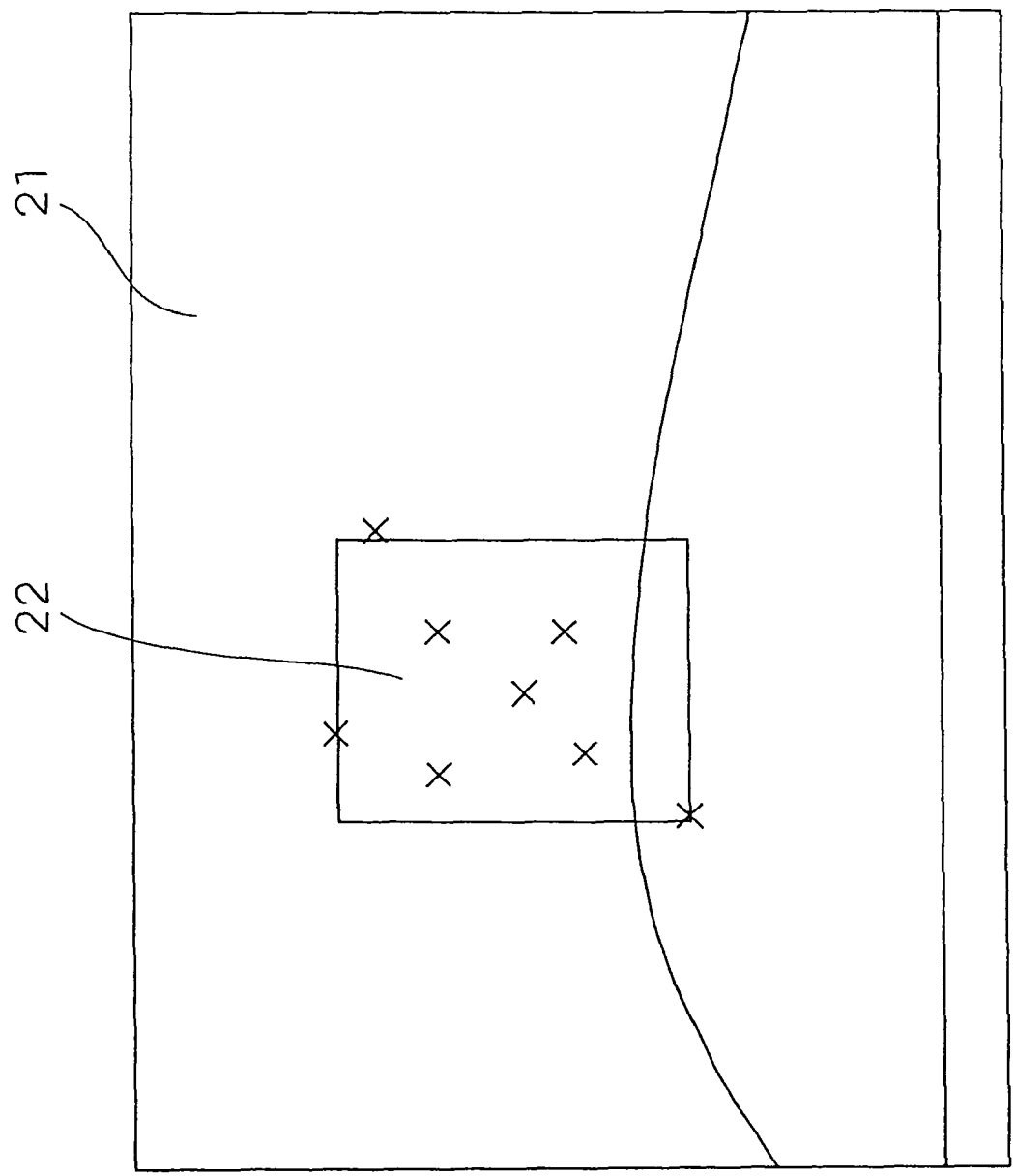
FIG. 3 is a schematic diagram illustrating an operation according to the first embodiment of the present invention.

FIG. 3 is a diagram of explaining an example of a calculating method of the changed region. Here, reference numeral 21 represents the whole screen of the PC. A mark "x" shown in FIG. 3 represents a pixel that has a change between the currently loaded screen and the previously loaded screen.

The changed region is obtained by calculating a minimum rectangle including all of the pixels having a change in the screen. FIG. 3 illustrates an example of a changed region 22 obtained by the calculation. At the time of an initial loading, however, the whole screen is considered to be the changed region because there exists no previously loaded screen.

If there is the changed region 22 calculated at Step S2, which means that the PC screen is changed, the process branches at Step S3 to Step S4. If there is no changing point and thus no changed region, it is determined at Step S3 that the PC screen is not changed and the process then branches to Step S6.

When the PC screen is changed and the process branches to Step S4, the compression degree is set to high in a compressing method using the high compression ratio, for example JPEG compression, to compress the changed region 22 calculated at Step S2. In other words, when the PC screen is changed, distortion in the screen is unlikely to be noticeable compared with the case where the screen is static, so that the compressing method with the high compression ratio is applied thereto. The number of recompression times n is then set to 0 at Step S5, a compressed image is written in a transmission memory at Step S12, and the process returns to Step S1. The number of recompression times n represents the number of times of compression performed at Step S9 or Step S10 after being determined at Step S3 that there is no changed region.

When the PC screen is not changed and the process branches to Step S6, it is determined at Step S6 whether the number of recompression times n is 2 or more, and if n is 2 or more, it is determined that it is not necessary to recompress the image and the process then returns to Step S1. In other words, when the image is compressed twice or more at Step S9 or Step S10 after the change of the PC screen is not detected, the transmission memory stores the image compressed without distortion. In this case, it is not required to rewrite the image in the transmission memory, which is identical to that written in the transmission memory, by compressing it again without distortion. Accordingly, it is determined that it is not necessary to recompress the image and the process then returns to Step S1. If n is determined to be 0 or 1 at Step S6, the process proceeds to Step S7.

At Step S7, where the time passage after the compression is performed at Step S4 or Step S9 is monitored, the process proceeds to Step S8 when a predetermined period of time, for example one second, passes. When the predetermined time has not passed, it is determined that the screen is not static and the process then returns to Step S1. In other words, when it is determined at Step S7 that the predetermined time has not passed since the compression is processed, the recompression will not be performed. Since the compression performed at Step S9 or Step S10 utilizes the compressing method with small or no distortion, a data size of the compressed image obtained therefrom becomes larger than that obtained by the compression at the high compression ratio performed at Step S4. Transmission of the compressed image with a larger data size takes more time, so that the recompression will not be allowed until a predetermined period of time passes after the previous compression.

At Step S8, it is changed the number of recompression times, and if it is n=0, the compression with small distortion, for example JPEG compression with low compression ratio, will be performed at Step S9. If n=1, the compression with no distortion, for example PNG method compression, will be performed at Step S10. In other words, when the PC screen is not changed, distortion in the screen is likely to be noticeable compared with the case where the PC screen is changed, so that the compressing method with small or no distortion will be applied. Moreover, by the operations at Steps S8, S9, and S10, the image to be compressed later is compressed at the lower compression ratio compared with the previously-compressed image. A method of calculating the region to be compressed at Step S9 or Step S10 will be hereinbelow described.

After performing the compression at Step S9 or Step S10, n is incremented by 1 at Step S11, the compressed image is written in the transmission memory at Step S12, and then the process returns to Step S1 of repeating the process.

As will be understood, the image is compressed twice at the maximum after it is determined that there is no changed region, namely the PC screen is not changed. In other words, when the PC screen still remains static after the image is compressed twice and written in the transmission memory, a process is not performed to compress the image for the third time and write the image in the transmission memory. As described above, the image is neither compressed nor outputted while the PC screen is not changed. The image is compressed and outputted at every predetermined period. When the predetermined period is repeated for the predetermined number of times or more, the image is neither compressed nor outputted.

Figure 4:
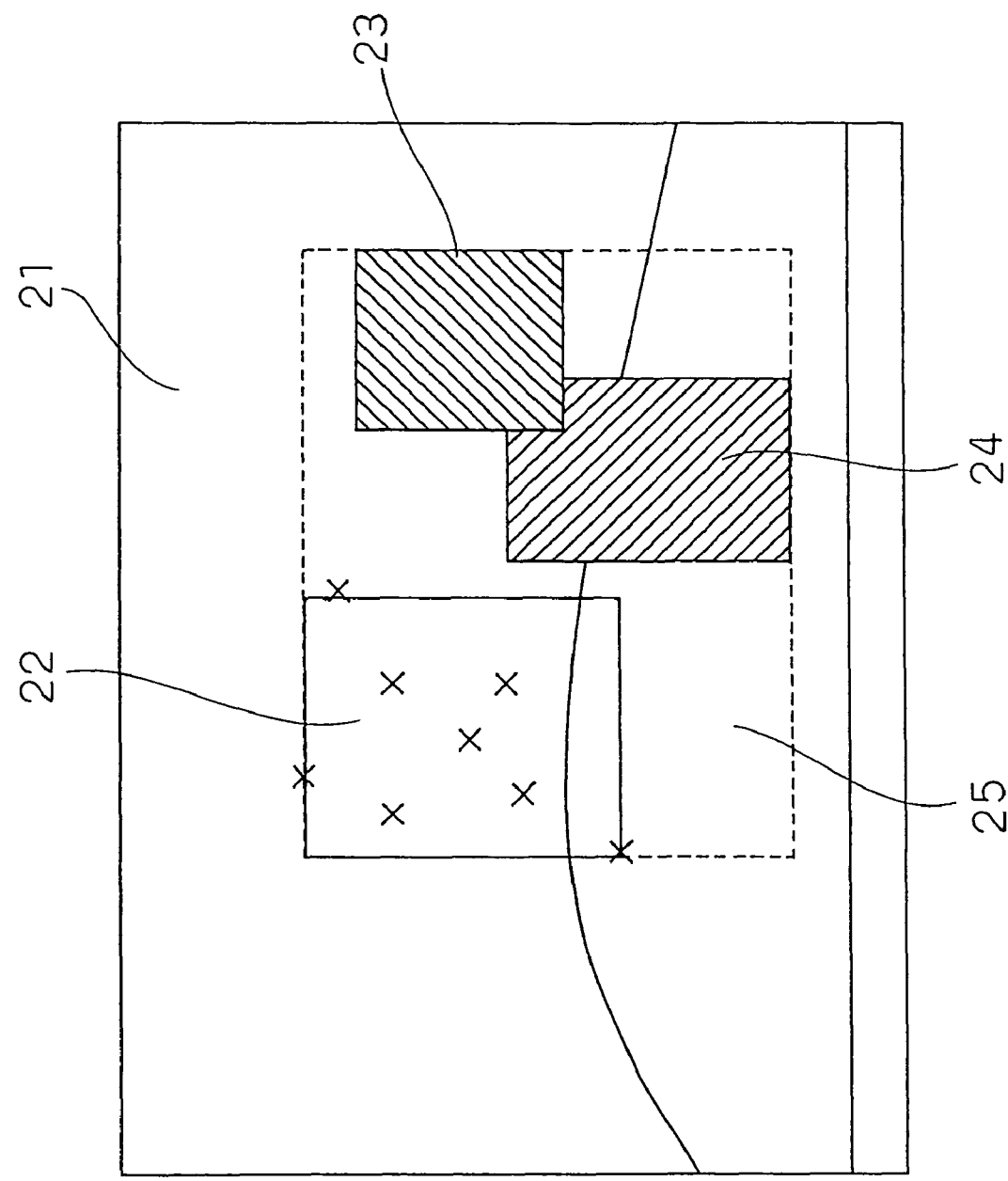
FIG. 4 is a schematic diagram illustrating an operation according to the first embodiment of the present invention.

Next, the method of calculating the region to be compressed at Step S9 and Step S10 will be described. FIG. 4 is a diagram of describing the method of calculating the region to be compressed at Step S9 and Step S10. Here, an example is shown in a case when the changed region in the screen is generated three times at Step S2 after the compression is performed at Step S9 or Step S10. The region 22 shown in FIG. 4 is the changed region calculated at Step S2 after the compression at Step S9 or Step S10, while a region 23 represents the region changed thereafter and a region 24 represents the region changed after that. The region to be compressed at Step S9, after these three times of changes are generated and then the screen remains static for a predetermined period of time, is a minimum rectangular region entirely including the regions 22, 23, and 24 shown in FIG. 4, namely a region 25 in FIG. 4. The region 25 includes the entire region compressed using the method with high compression ratio at Step S4. It should be noted that the region to be compressed at Step S9 and Step S10 might be simply a whole screen 21 shown in FIG. 4.

As described above, when the screen is changed, utilizing the compressing method with high compression ratio enables the high-speed processing while large distortion is generated. In addition to that, since only the changed region is compressed, the processing speed may be further increased.

That is to say, the large distortion is inherently less noticeable when the screen is changed. In addition, the image is compressed using the method with less distortion when the screen remains static for a predetermined period of time, thereby making it possible to achieve the high-quality compression for the static image in which the distortion is likely to be noticeable.

While the JPEG compressing method is illustrated as the compressing method with high compression ratio and less distortion in the present embodiment, it is not limited thereto. Similarly, the PNG compressing method is illustrated as the compressing method with no distortion, it is not limited thereto.

Moreover, while it is described in the present embodiment that the image is compressed using the method with high compression ratio when the screen is changed and using the method with less or no distortion when the screen remains static, it is not limited thereto. It is possible to compress the image at different compression ratios according to a degree of change in screen.

Furthermore, while it is described in the present embodiment regarding the case that the number of recompression times is twice, first by the low-compression JPEG method and second by the PNG method, it is not limited thereto. For example, the number of recompression times may be once, and the first time compressing may be either of the low-compression JPEG method or the PNG method, but not limited thereto. Moreover, the number of recompression times may be set to any arbitrary number of times including three times or more. Meanwhile, when the number of recompression times is set to twice or more, the image to be compressed later should be compressed at the lower compression ratio, or at the compression ratio with less distortion or using the compressing method with less distortion, compared with the image previously compressed.

Furthermore, it is described in the present embodiment that the image in the changed region is compressed using the compressing method with high compression ratio when the changed region is detected, it is not limited thereto. It may be considered that the most of the screen is changed when the changed region occupies more than a predetermined fraction, for example 85%, and, in such a case, the region other than the changed region may be compressed as well at the high compression ratio. When the changed region is not detected, the whole screen may be compressed using the compressing method with less or no distortion.

While it is described in the present embodiment that the compression process is not performed when the PC screen remains static for a predetermined period of time, for example, one second after the compression process is performed, a method to count the predetermined number of loops instead of the predetermined period of time may be applied. Moreover, when different static images composed of a drawing and an instruction text are alternatively displayed at every five seconds, the image may be compressed using the compressing method with low or no distortion and outputted upon detecting the PC screen not being changed. This is because that, while the static images are displayed alternatively at a predetermined interval, even when the imaged is compressed using the compressing method with low or no distortion and thereby output upon detecting the PC screen not being changed, a load may not be applied to the system.

While it is described with reference to the flowchart shown in FIG. 1 according to the present embodiment that the compressed image or the like is written in the transmission memory at Step S12, it is not limited thereto. At Step 12, instead of writing the compressed image or the like in the transmission memory, the compressed image or the like may be written in a storage medium, such as a magneto-optical disk medium, an optical disk medium, or a magnetic disk medium, or written in a memory or the storage medium at a remote location via a network or the like.

While it is described that the process branches based on whether the predetermined period of time passes at Step S7, it is not limited thereto, and any variable time may be applied under a predetermined condition. For example, while it is described in the present embodiment that the region to be compressed at Steps S9 and S10 is the minimum rectangular region entirely including the regions 22, 23, and 24 shown in FIG. 4, the region may be calculated in advance to set a condition based on the size of the region so as to shorten the time until the recompression is performed when a region is small and to extend the time when a region is large. Thereby, that makes it possible to adjust the load applied to the system.

While it is described in the present embodiment that it is determined whether the PC screen is changed based on the presence/absence of the changed region at Step S2, it is not limited thereto. It may be determined, at Step S2, that the PC screen is not changed when the changed region is equal to or smaller than a predetermined size, and that the PC screen is changed when the changed region is larger than the predetermined size.

Further, while it is configured in the present embodiment in such a way that whether the PC screen is changed will be determined based on the presence/absence of the changed region at Step S2, it may be configured in such a way that the change is not detected depending on a certain size or position of the changed region. An example thereof will be illustrated in FIG. 9.

Figure 9:
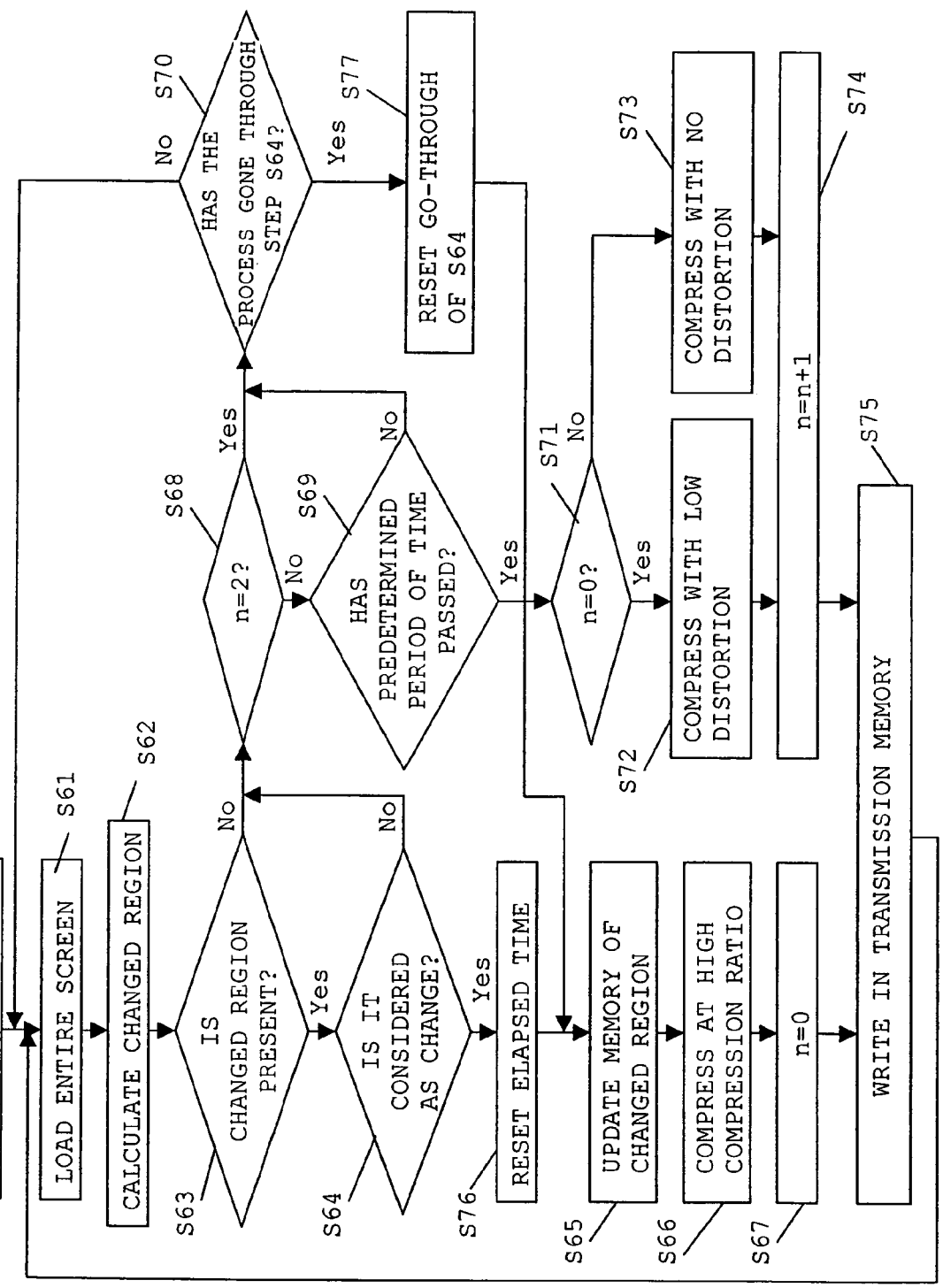
FIG. 9 is a flowchart illustrating another operation according to the first embodiment of the present invention.

FIG. 9 illustrates, as compared with FIG. 1, additional steps including Step S64 to determine whether a change occurred, Step S70 to determine whether the process went through Step S64, Step S65 to store the changed region, Step S76 to reset elapsed time, and Step S77 to reset the go-through of Step S64. There will be described an example of the change not being considered as the change when the changed region stored at Step S65 having the size of 32 pixels in horizontal direction by 32 pixels in vertical direction (referred to as 32×32, hereinbelow) is in the same position as the current changed region at Step S62. The same position herein refers to that the region is positioned within the area of, for example, 8×8 pixels in horizontal and vertical directions, but not limited thereto. For example, calculation of the changed region may be performed using an 8-pixel unit to thereby consider the regions being in the same position when the sizes of the 8-pixel units are identical, but not limited thereto.

Figure 10:
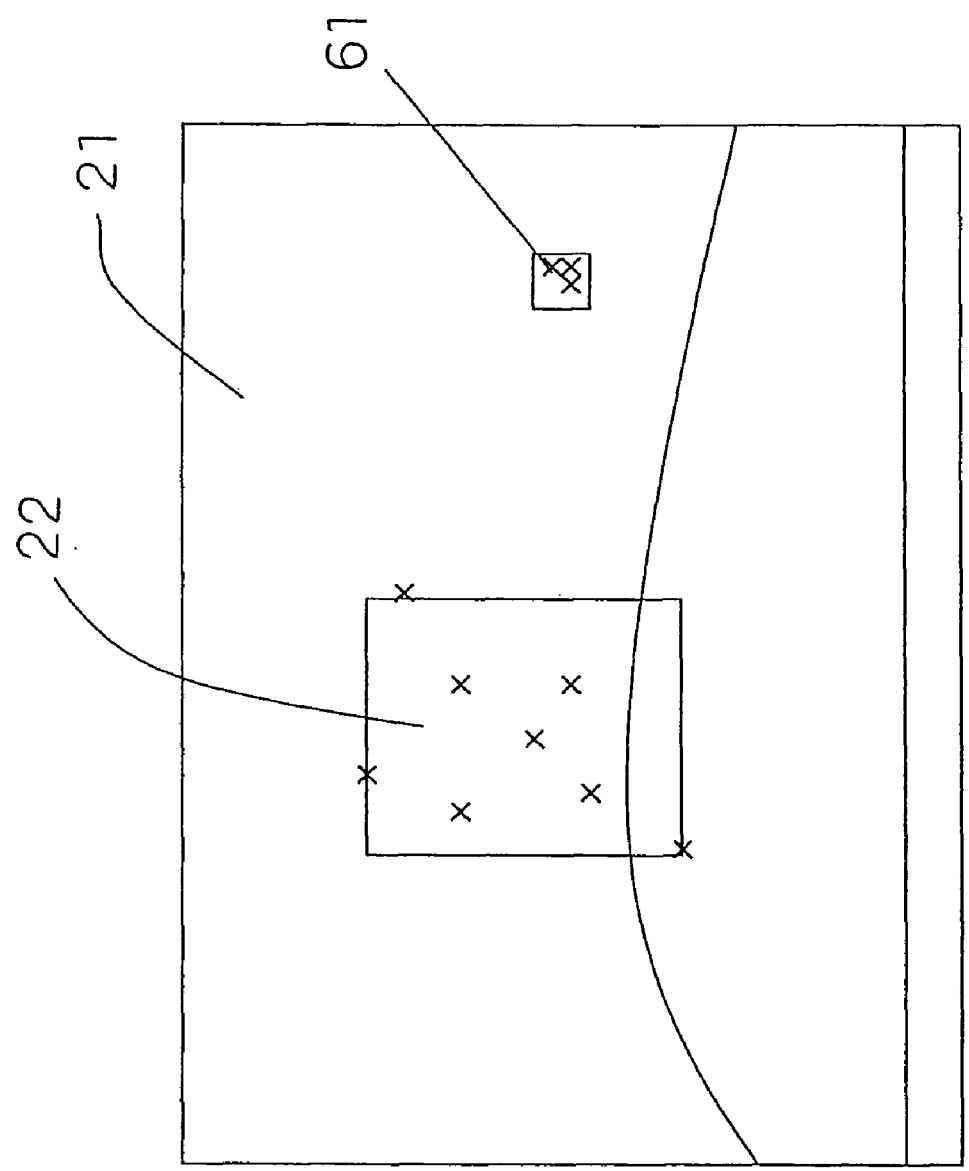
FIG. 10 is a schematic diagram illustrating another operation according to the first embodiment of the present invention.

FIG. 10 shows a changing point in the PC screen by a mark "x". In FIG. 10, when the size of the changed region 61 is equal to or smaller than 32×32 and the position thereof is identical to that of the region stored at S65, the region is not considered as the changed region at Step S64 and the process then proceeds to Step S68. When n=2 and the predetermined period of time has not been passed, it is determined that the recompression is not required and the process proceeds to Step S65 via Step S70. It is determined that there is no change at Step S64, however, in this case, it does not take time for recompression and it is actually changed, so that the changed region 61, not considered as the changed region, will be compressed at Step S66. In this manner, it can follow the change in the changed region 61 other than in the case of recompression. The process then proceeds to Step S67 and Step S75 to write in the transmission memory and returns to Step S61 again. While the process starting from Step S61 is repeated, when the changed region is larger than 32×32 or there is a change in the other position than the stored position, the process goes through Step S76 to reset the time. When the time is not reset and the change only of 32×32 or smaller keeps occurring in the same position, the process branches at Step S69 to Step S71, where the recompression is performed and the distortion in the image is further decreased. The region to be recompressed may be the minimum rectangular region including the region changed after the compression at Step S72 or Step S73 as described above, or may be the whole screen 21 shown in FIG. 10.

If the region where the image is changed is equal to or smaller than the a predetermined size in area, and is in the same position as the previously detected region where the image is changed, determining that the image is not changed enables the image to be replaced with the image with small distortion by the recompression even when the change in a small identical region not requiring high-speed change, for example a blinking cursor, is detected.

As described above, according to the present embodiment, there are provided change detection means of detecting whether an image to be processed is changed exceeding a predetermined criterion; compression means of compressing the image so that a compression degree may be higher when a detection result by the change detection means indicates that the image is changed exceeding the predetermined criterion, and when the detection result by the change detection means indicates that the image is changed not exceeding the predetermined criterion, of compressing the image so that the compression degree may become lower; and output means of outputting the compressed image, so that the image can be compressed smaller in volume at high speed while preventing the image from the degradation.

Moreover, according to the present embodiment, there are provided change detection means of detecting whether an image to be processed is changed exceeding a predetermined criterion; compression means of compressing the image so that a compression degree of the predetermined rectangular region including the changed region may become higher when the detected result by the change detection means indicates that the image is changed exceeding the predetermined criterion, and when the detected result by the change detection means indicates that the image is not changed exceeding the predetermined criterion, of compressing the image so that a compression degree of a rectangular region including all of the rectangular regions among former images may become lower than that of the image; and the output means of outputting the image of the predetermined rectangular region including the changed region when the detection result by the change detection means indicates that the image is changed exceeding the predetermined criterion, and outputting the image of the rectangular region including all of the rectangular region when the detection result by the change detection means indicates that the image is changed not exceeding the predetermined criterion, so that the image can be compressed smaller in volume at high speed while preventing the image from the degradation.

It should be noted that the changed region in the present embodiment is an example of the predetermined rectangular region including the changed region of the present invention, while the region 25 shown in FIG. 4 in the present embodiment is an example of the rectangular region including all of the rectangular regions of the image previously detected before the current image of the present invention.

Second Embodiment

Figure 6:
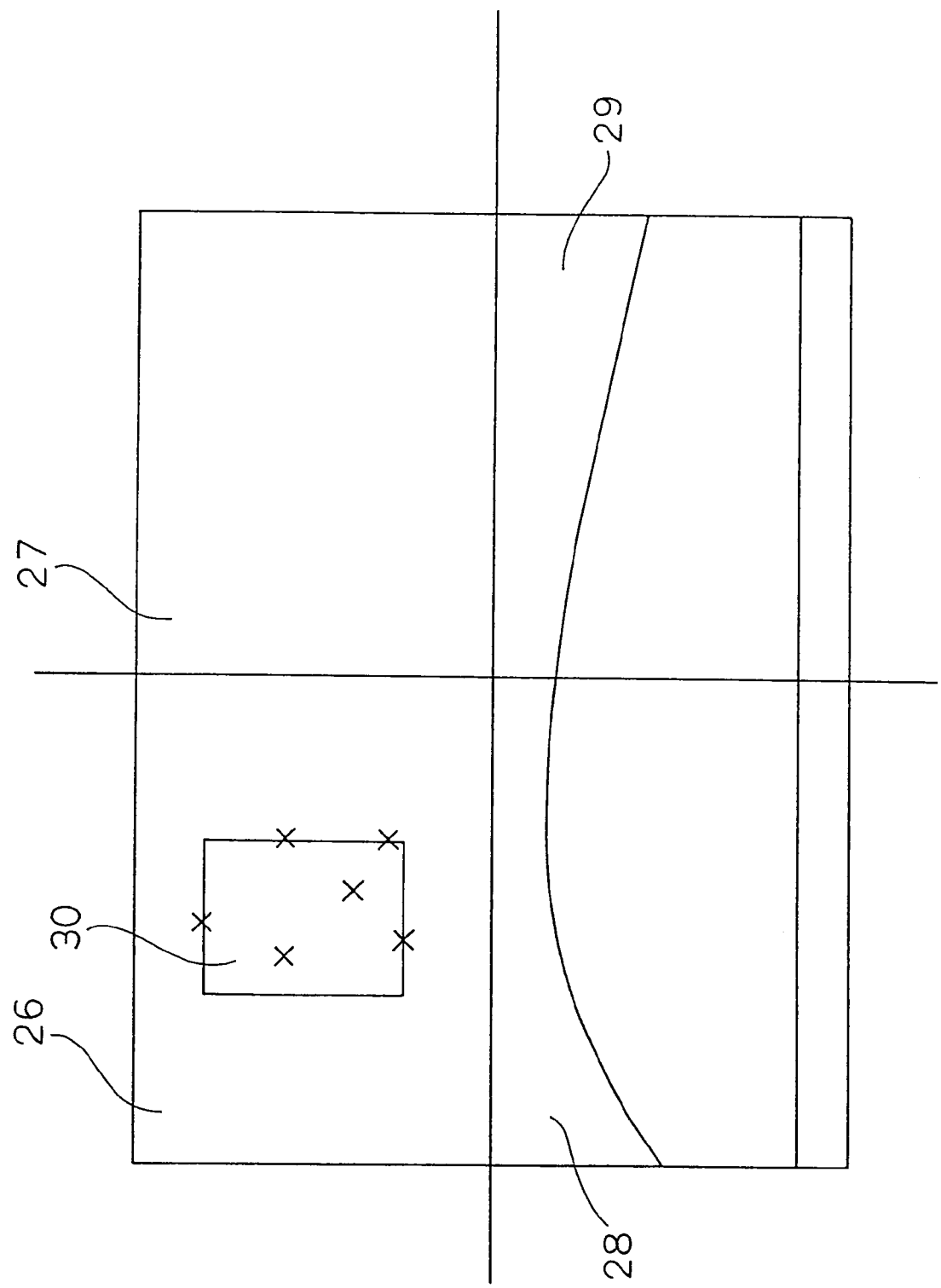
FIG. 6 is a schematic diagram illustrating an operation according to the second embodiment of the present invention.

An image processing method according to a second embodiment of the present invention will be explained. In this embodiment, the images displayed on the screen of the personal computer (hereinbelow, referred to as PC) is consecutively loaded and compressed. In other words, the contents of the whole PC screen are temporarily stored in the image memory (frame buffer or GRAM) and the image is periodically read therefrom to be compressed in the present embodiment. FIG. 6 illustrates the PC screen schematically, which shows an example in this embodiment to process the image by dividing it into four blocks of regions 26 to 29.

Figure 5:
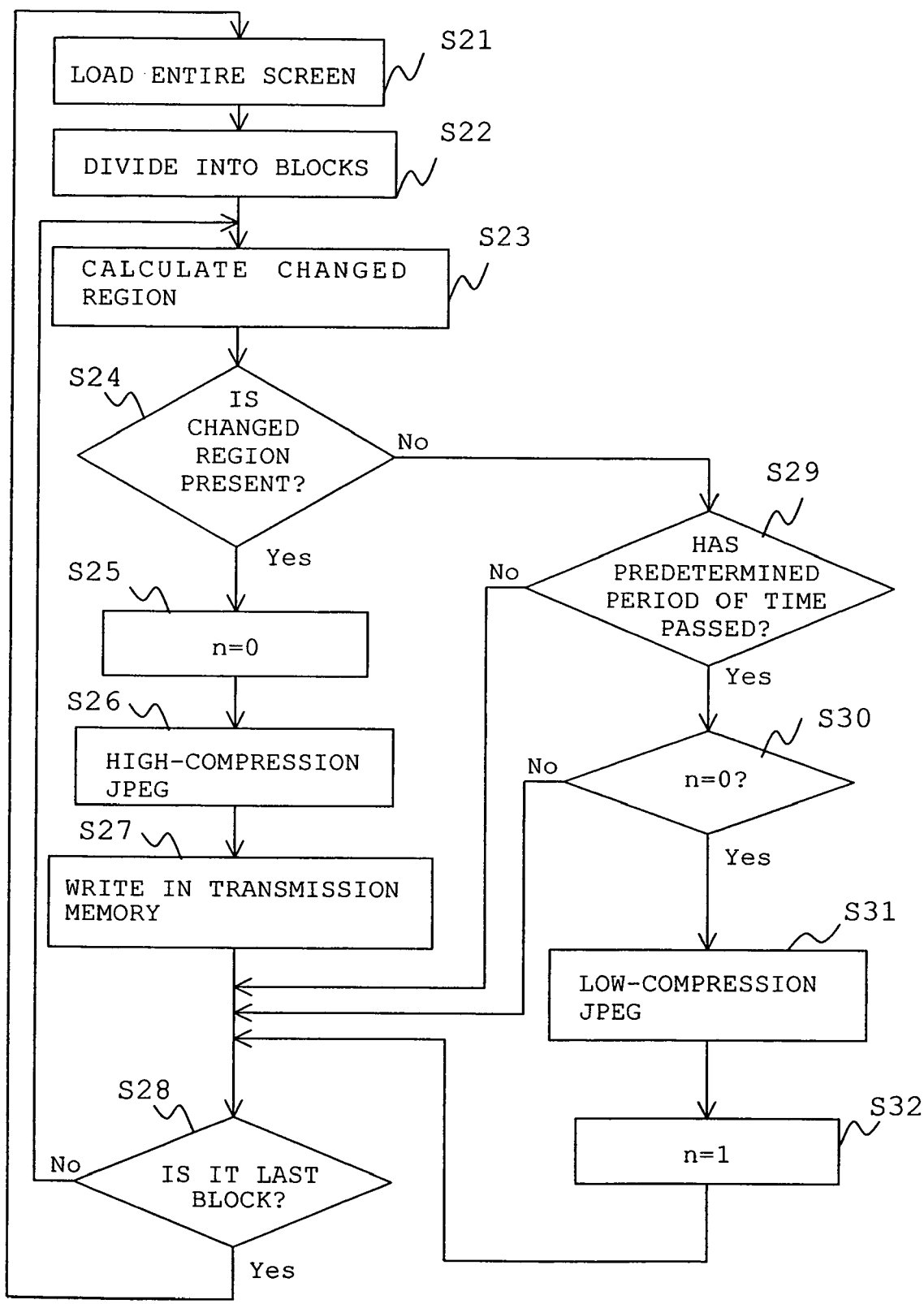
FIG. 5 is a flowchart illustrating an operation of an image processing method according to a second embodiment of the present invention.

FIG. 5 is a flowchart illustrating the image processing method according to the second embodiment of the present invention. Hereinbelow, the method will be explained in detail with reference to FIG. 5.

At Step S21, the whole screen is captured. At Step S22, the image is divided into the blocks. In the example shown in FIG. 6, it is divided into the four regions 26 to 29. At Step S23, the changed region is calculated for every divided region. When a mark "x" is the changing point in a region 26 shown in FIG. 6, for example, a minimum rectangular region 30 will be the changed region.

When there is the changed region, the number of recompression times n is set to 0 at Step S24 and the compression is then performed using the high-compression JPEG method. At Step S27, the image compressed by the high-compression JPEG method is written in the transmission memory. At Step S28, it is determined whether the block to be processed is the last block. For example, when the process is performed in the order of the regions 26, 27, 28, and 29, it is determined at Step S28 that the block is the last block after the region 29 is processed, and then the process returns to Step S21 to capture the whole screen. When the block is not the last block, the process returns to Step S23 for processing the next block.

When the changed region is not calculated at Step S23, the process branches at Step S24 to Step S29. A elapsed time of a predetermined period, for example one second, is monitored at Step S29 and, when it is determined that a predetermined period of time passes after the compression at Step S26, the number of recompression times n is then searched at Step S30. When n=0, the compression is performed using the low-compression JPEG method at Step S31. When n=1, it means was compression using the low-compression JPEG method is performed for the block, so that the process proceeds to Step S28 without performing the recompression. As will be understood, it is assumed that n holds different values for the respective divided regions.

After the compression using the low-compression JPEG method at Step S31, the number of recompression times n is set to 1 at Step S32 and the process then proceeds to Step S28. At Step S28, it is determined whether the block is the last block as described above.

As a result, while the screen is changed, utilizing the compressing method with high compression ratio enables the high-speed processing while large distortion is generated. Moreover, since only the changing point is compressed, the processing speed may be further increased.

The large distortion is inherently less noticeable when the screen is changed. Furthermore, since the image is compressed using the method with less distortion when the screen remains static for a predetermined period of time, the high-quality compression may be realized for the static image in which the distortion is likely to be noticeable.

While the high-compression JPEG method is illustrated as the compressing method at Step S26 in the present embodiment, it is not limited thereto, and the other compressing method with high compression ratio may be applied. Similarly, the low-compression JPEG method is illustrated as the compressing method at Step S31, it is not limited thereto, and the PNG method may be applied, for example.

Furthermore, while it is described in the present embodiment regarding the case where the number of recompression times is only once using the low-compression JPEG method, it is not limited thereto. The recompression may be performed twice, first by the low-compression JPEG method and second by the PNG method, but not limited thereto. Moreover, the number of recompression times may be set to any arbitrary number of times including three times or more. Meanwhile, when the number of recompression times is set to twice or more, the image to be compressed later should be compressed at the lower compression ratio, at the compression ratio with less distortion, or using the compressing method with less distortion, compared with the image previously compressed.

Additionally, in the present embodiment, there is shown an example where while the elapsed time of the predetermined period is monitored at Step S29, if the predetermined period has passed and n=0, the blocks are compressed respectively using the low-compression JPEG method at Step S31, the example may be applied to the whole screen. In this regard, a single value of n is given for the whole screen instead of the respective divided blocks, and it is determined whether there is the changed region in the whole screen at Step S24.

While the method is described to monitor the predetermined period of time to pass at Step S29, the method to count the predetermined number of loops may be applied and it is not limited thereto.

While it is described that the screen is divided into two in the horizontal direction and two in the vertical direction, the screen may be divided into only either of the horizontal direction an the vertical direction and it is not limited thereto.

While it is described that the process branches based on whether the predetermined period of time passes at Step S29, it is not limited thereto, and a variable time may be applied under a predetermined condition. For example, the region may be calculated in advance to set a condition based on the size of the region so as to shorten the time until the recompression is performed when a region is small for a smaller region and to extend the time when a region is large.

Third Embodiment

Figure 7:
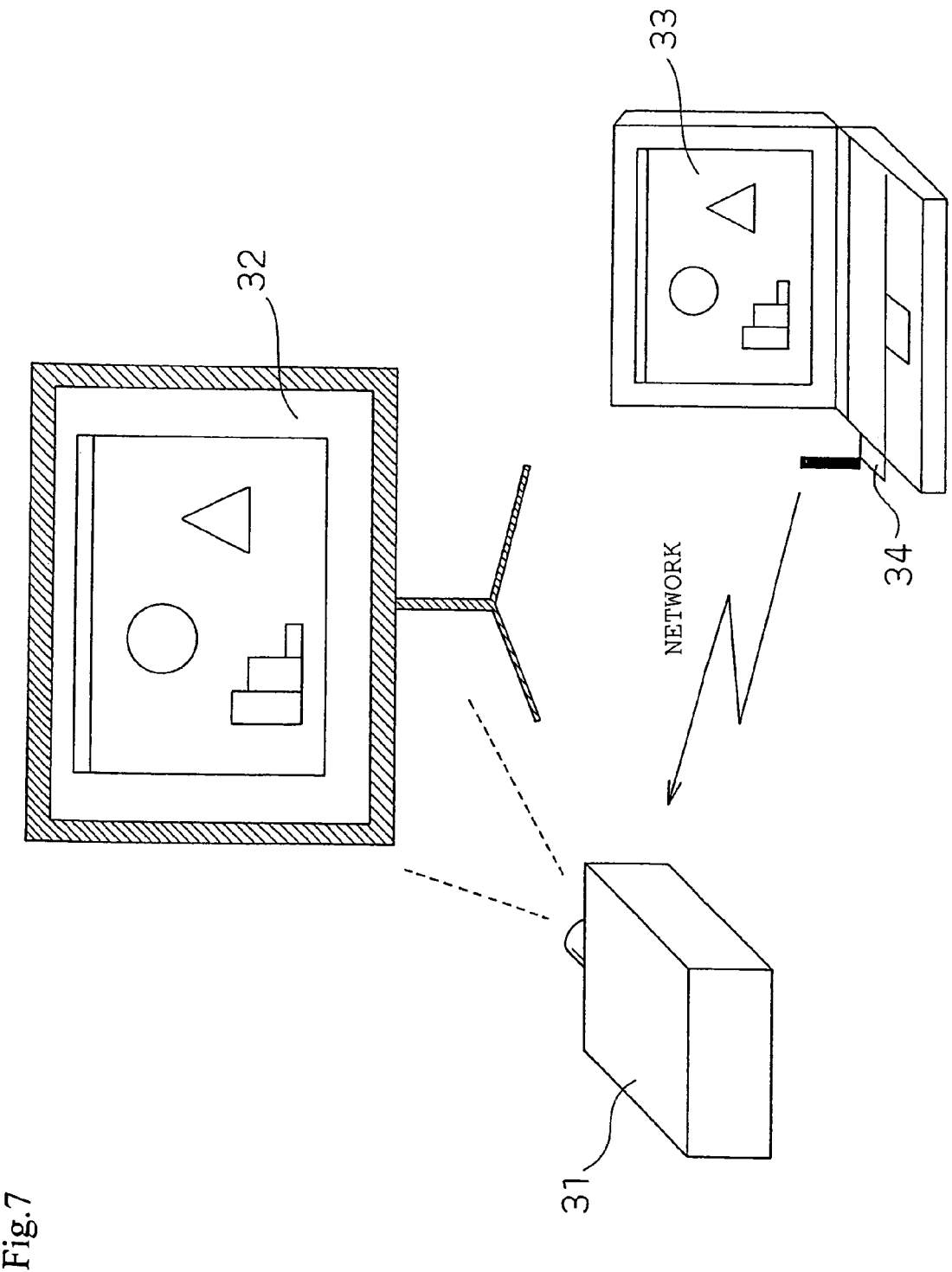
FIG. 7 is a block diagram illustrating a third embodiment of the present invention.

FIG. 7 is a block diagram of a display system according to a third embodiment of the present invention. In FIG. 7, reference numeral 31 represents a projector, reference numeral 32 represents a screen of the image from the projector to be projected, reference numeral 33 represents a PC, and reference numeral 34 represents a wireless LAN transceiver. In the display system, the image displayed on the PC 33 is loaded into the memory. The loaded image is then compressed and transmitted to the projector 31 via the wireless LAN transceiver 34. The projector 31 receives the compressed image and expands the image to be displayed on the screen 32. As a result, the image displayed on the screen of the PC 33 may be displayed on the screen 32 as well. It would be appreciated that the PC 33 is an image signal generating apparatus of generating an image signal, and the wireless LAN transceiver 34 constitutes a transmitting apparatus of transmitting the generated image signal. The projector 31 constitutes a display device of receiving and displaying the transmitted image.

Figure 8:
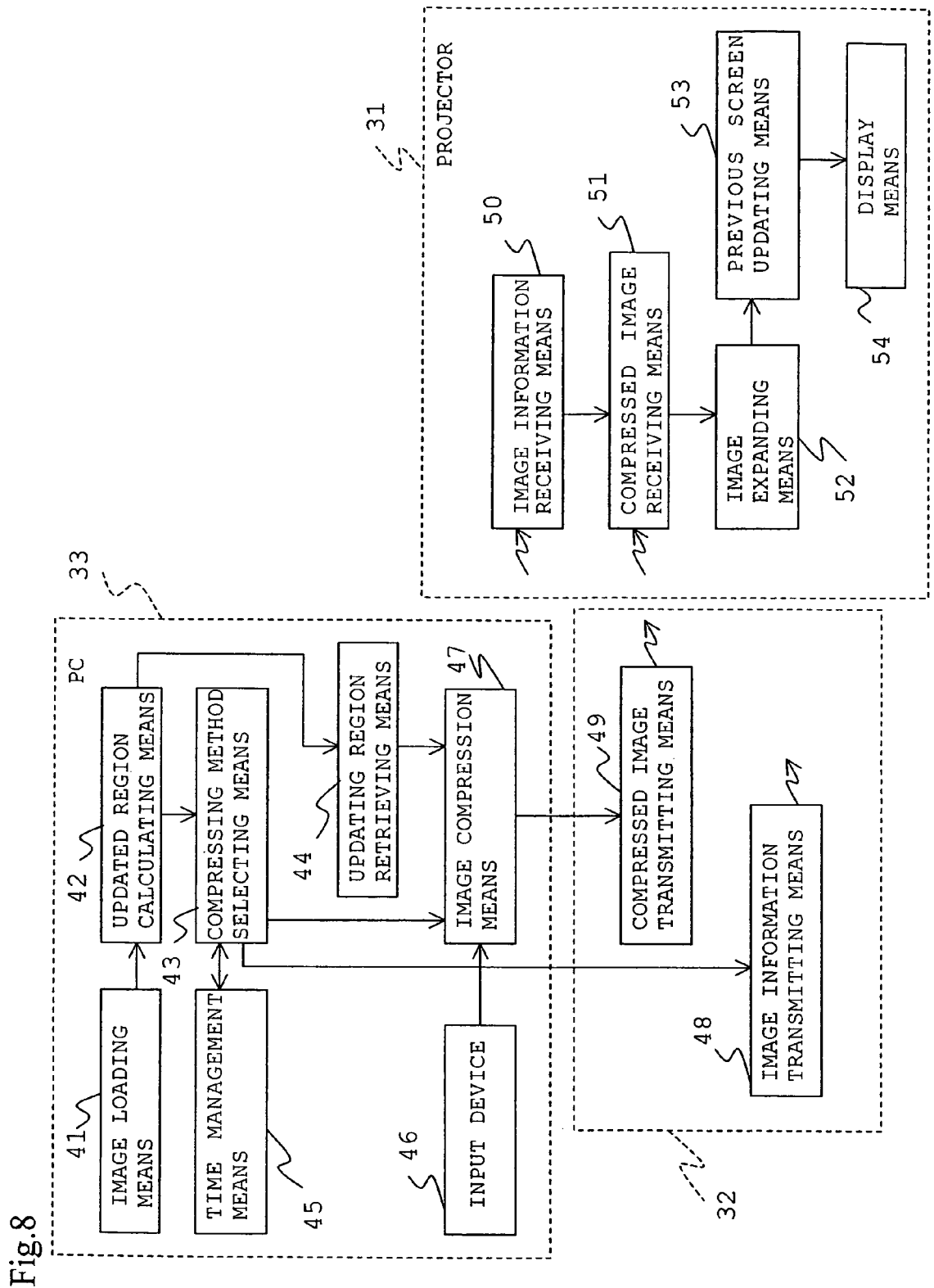
FIG. 8 is a block diagram illustrating an operation according to the third embodiment of the present invention.

FIG. 8 is a block diagram illustrating an internal specific configuration. In FIG. 8, reference numerals 41 through 47 represent processing blocks on the PC side, and reference numerals 50 through 54 represent processing blocks on the projector side.

The PC 33 is provided with image loading means 41, updated region calculating means 42, updating region retrieving means 44, time management means 45, compressing method selecting means 43, image compression means 47, an input device 46, image information transmitting means 48, and compressed image transmitting means 49.

The image loading means 41 is means of loading the whole screen of the PC 33 into the memory.

The updated region calculating means 42 is means of comparing the current screen with the previous screen to calculate the updated region.

The updating region retrieving means 44 is means of retrieving the image of the region to be updated.

The time management means 45 is means of selecting the compressing method based on the time when the update is executed.

The compressing method selecting means 43 is means of selecting the compressing method based on the information from the time management means 45.

The image compression means 47 is means of compressing the image in the updating region 44 by means of the compressing method selection means 43.

The input device 46 is means of inputting instructions given by a keyboard, a mouse, etc.

The image information transmitting means 48 is means of transmitting the image information obtained from the updated region calculating means 42 or the compressing method selecting means 43 to the projector.

The compressed image transmitting means 49 is means of transmitting the compressed image to the projector 31.

As will be understood, the image information transmitting means 48 and the compressed image transmitting means 49 are implemented by the wireless LAN transceiver 34.

The projector 31 is provided with the image information receiving means 50, compressed image receiving means 51, image expanding means 52, previous screen updating means 53, and display means 54.

The image information receiving means 50 is means of receiving the image information.

The compressed image receiving means 51 is means of receiving the compressed image.

The image expanding means 52 is means of expanding the compressed image based on the information from the image information receiving means 50.

The previous screen updating means 53 is means of updating the image memory for only the section updated from the previous screen based on the image information obtained from the image information receiving means 50.

The display means 54 is means of displaying the information in the image memory.

In this embodiment, the updated region calculating means 42 is the example of the change detection means of the present invention, the time management means 45, the compressing method selecting means 43, the updating region retrieving means 44, and the image compression means 47 are the examples of the compression means of the present invention, and the image information transmitting means 48 and the compressed image transmitting means 49 are the examples of the output means of the present invention. Similarly, in this embodiment, the image expanding means 52 and the previous screen updating means 53 are examples of the expanding means of the present invention, and the display means 54 is an example of the output means of the present invention.

The operation of the display system configured as shown above will be explained.

Here, the detailed description regarding the sections similar to those of the first and second embodiments will be omitted.

The image of the whole screen is loaded into the memory by the image loading means 41. The image is compared with the previous image to calculate the changed region using the updated region calculating means 42. The changed region is obtained as the minimum rectangular region including all of the changing points. When the changed region is calculated, the high-compression JPEG method is selected by the compressing method selecting means 43 and the updating region retrieving means 44 retrieves the region calculated by the updated region calculating means 42. The image retrieved by the updating region retrieving means 44 is compressed using the image compression means 47.

when the updated region is not calculated by the updated region calculating means 42, the low-compression JPEG method is selected by the compressing method selecting means 43 when it is determined that the predetermined period of time passes after the previous compression of the image by measuring the time using the time management means 45. The updating region retrieving means 44 then retrieves the image data of the whole screen, which is compressed by the image compression means 47. However, when the input is performed by the input device 46 such as a keyboard or a mouse, the compression is interrupted, and the process restarts from the image loading by the image loading means 41. The image information transmitting means 48 transmits the information regarding the region retrieved by the updating region retrieving means 44 and the compressing method selected by the compressing method selecting means 43 to the projector 31. The image information transmitting means 48 also transmits the compressed image to the projector 31.

In the projector 31, the image information receiving means 50 retrieves the image information, and the compressed image receiving means 51 retrieves the compressed image from the PC 33, where the image is expanded by the image expanding means 52 based on the image information. The updating means 53 then updates the image data expanded to the image memory position of the projector 31 corresponding to the coordinates obtained by the image information from the image information receiving means 50, so that the image memory information of the projector 31 is displayed by means of the display means 54. According to the aforementioned configuration, the image displayed on the PC 33 may be projected by the projector 31 as well.

Incidentally, it is described in the present embodiment that the PC is used as the image signal generating apparatus, but a PDA may be utilized instead and it is not limited thereto. Meanwhile, it is described that the wireless LAN is used as the transceiver, but a wired LAN may be utilized instead and it is not limited thereto. Moreover, while it is described that the projector is used as the display device, a plasma display, a CRT display, or a liquid crystal display may be utilized instead and it is not limited thereto.

In addition, it is described that the high-compression JPEG and low-compression JPEG methods are selected as the image compression means 47, but the high-compression JPEG method and the PNG method may be selected and it is not limited thereto.

Meanwhile, the updated region calculating means 42 may apply the method to divide the image loaded by the image loading means into the regions to process the regions respectively. In this case, the compressing method selecting means 43, the updating region retrieving means 44, and the image compression means 47 also perform the processes for the divided regions respectively.

As described above, when the image updated region is calculated, the image on the PC 31 is changed, so that utilizing the compressing method with high compression ratio while the screen is changed may allow the high-speed processing while the large distortion is generated. Moreover, since only changed region is compressed, the processing speed may be further increased.

The large distortion is inherently less noticeable when the screen is changed. Since the image is compressed using the method with less compression ratio when there is no updated region in the image for a predetermined period of time, the high-quality compression may be realized for the static image in which the distortion is likely to be noticeable.

Incidentally, even in the third embodiment, the various modifications described in the first and second embodiments may be similarly applied.

It should be understand that the program according to the present invention is a program to cause a computer to perform the functions of all or some of the means of the aforementioned transmitting apparatus according to the present invention and is a program operable with the computer.

The storage medium according to the present invention is a storage medium of storing a program to cause a computer to perform the functions of all or some of the means of the aforementioned transmitting apparatus according to the present invention, wherein the storage medium is computer-readable, and the read program executes the functions cooperating with computer.

The aforementioned term "some of the means" of the present invention refers to one or some of the means among a plurality of means.

The aforementioned term "the function of the means" of the present invention refers to all or some of the functions of the means.

An embodiment of the program according to the present invention may be such an embodiment that the program is stored in the storage medium readable by the computer and cooperates with the computer.

Another embodiment of the program according to the present invention may be such an embodiment that the program is transmitted via a transmission medium and read by the computer, and cooperates with the computer.

A data structure of to the present invention includes a database, a data format, a data table, a data list, or a data type.

The storage medium includes such as a ROM, while the transmission medium includes a transmission medium such as the Internet, light, electric wave, or acoustic wave.

The aforementioned computer of the present invention is not limited to the simple hardware such as the CPU, while it may include a firmware or an OS as well as peripheral devices.

It should be noted understood that the configuration of the present invention may be implemented by the software or by the hardware.

As a result of the aforementioned description, according to the present embodiment, it may be determined whether the image to be compressed is a dynamic or static picture, so that by selecting the appropriate compressing method, it is possible to provide the compressing method of realizing the high-speed respondibility and the high quality in image together.

INDUSTRIAL APPLICABILITY

As can be apparent from the foregoing description, the present invention can provide the transmitting apparatus, the image processing system, the image processing method, the program, and the storage medium of compressing the image smaller in volume at high speed while preventing the degradation of the image.

DESCRIPTION OF THE DRAWINGS

FIG. 1
(1) START PROCESSING
S1: LOAD ENTIRE SCREEN
S2: CALCULATE CHANGED REGION
S3: IS CHANGED REGION PRESENT?
S4: COMPRESS AT HIGH COMPRESSION RATIO
S7: HAS PREDETERMINED PERIOD OF TIME PASSED?
S9: COMPRESS WITH LOW DISTORTION
S10: COMPRESS WITH NO DISTORTION
S12: WRITE IN TRANSMISSION MEMORY
FIG. 5
S22: DIVIDE INTO BLOCKS
S26: HIGH-COMPRESSION JPEG
S27: WRITE IN TRANSMISSION MEMORY
S28: IS IT LAST BLOCK?
S31: LOW-COMPRESSION JPEG

Figure 11:
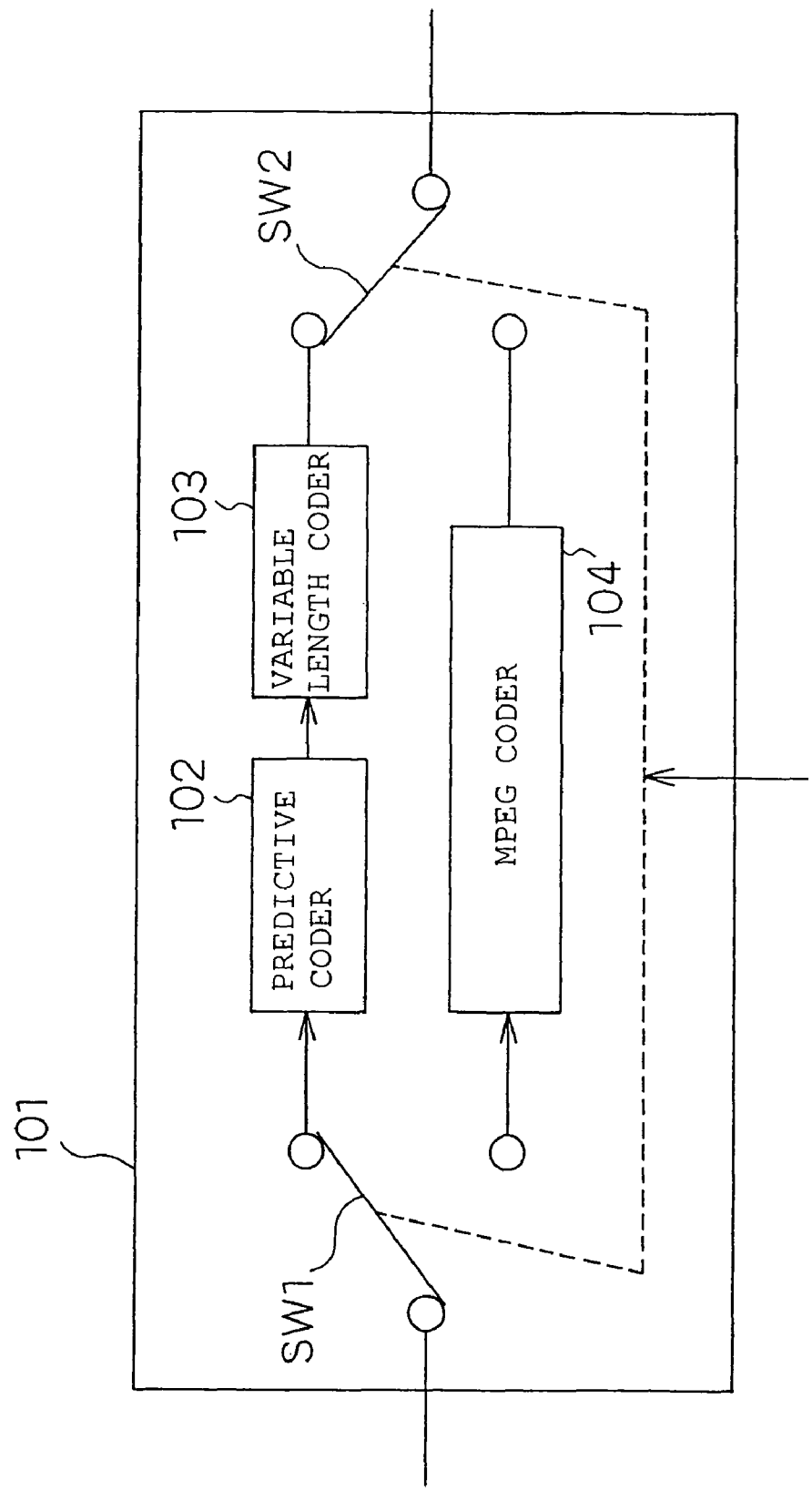
FIG. 11 is a block diagram illustrating a configuration of a conventional image processing device.

FIG. 7
(1) NETWORK
FIG. 9
S64: IS IT CONSIDERED AS CHANGE?
S76: RESET ELAPSED TIME
S65: UPDATE MEMORY OF CHANGED REGION
S77: RESET GO-THROUGH OF S64
FIG. 11
PREDICTIVE CODER
VARIABLE LENGTH CODER
MPEG CODER

What is claimed is:

1. A transmitting apparatus comprising:
change detection means of detecting whether an image to be processed is changed exceeding a predetermined criterion;
compression means including a time management means of managing a predetermined time, wherein the compression means compresses said image so that a compression degree may be higher when a detection result by said change detection means indicates that said image is changed exceeding said predetermined criterion, and when the case where the detected result by said change detection means indicates that said image is changed not exceeding said predetermined criterion elapsed by said predetermined time, compresses said image so that the compression degree may become lower; and
output means of outputting said compressed image.

2. The transmitting apparatus according to claim 1, wherein
said image to be processed is temporarily stored in an image memory, and
said change detection means periodically reads said image from said image memory to compare said before and after images, and detects whether said image to be processed is changed exceeding said predetermined criterion.

3. The transmitting apparatus according to claim 1, wherein said predetermined criterion is the number of pixels changed between said before image and said after image.

4. The transmitting apparatus according to claim 1, wherein said predetermined criterion is a level by which to determine that said image has not been changed, if said region where the image is changed is smaller than a predetermined size in area, and is in the same position as the previously detected region where the image was changed.

5. The transmitting apparatus according to claim 1, wherein said compression means compresses said image by changing the compression ratio of said image according to a degree of change in said image detected by said change detection means.

6. The transmitting apparatus according to claim 1, wherein
while said image is not changed, except for every predetermined period, said compression means does not compress said image and said output means does not output said image, and
said compression means compresses said image at every predetermined period and said output means outputs said image at every predetermined period.

7. The transmitting apparatus according to claim 6, wherein said compression means does not compress said image when said predetermined period is repeated for a predetermined number of times or more, and said output means does not output said image when said predetermined period is repeated for said predetermined number of times or more.

8. The transmitting apparatus according to claim 7, wherein when compressing said image at said every predetermined period, said compression means compresses said image to be compressed later at a compression ratio lower than a compression ratio of said image compressed earlier.

9. The transmitting apparatus according to claim 1, wherein
said image to be processed is that generated by an image signal generating apparatus, and
said image signal generating apparatus is a personal computer.

10. The transmitting apparatus according to claim 1, wherein
for each of a plurality of blocks into which said image that is generated by said image signal generating apparatus is zone-divided, said change detection means detects whether said image to be processed is changed exceeding said predetermined criterion, and
for every said block in which it has been detected whether said image to be processed is changed exceeding said predetermined criterion, said compression means compresses said image so that the compression degree may become higher when said detection result by said change detection means indicates that said image is changed exceeding said predetermined criterion elapsed by said predetermined time, compresses said image so that the compression degree may become lower when said detection result by said change detection means indicates that said image is changed not exceeding said predetermined criterion.

11. An image processing system comprising:
an image signal generating apparatus of generating an image;
a transmitting apparatus including change detection means of detecting whether said image to be processed that is generated by said image signal generating apparatus is changed exceeding a predetermined criterion, compression means of compressing said image so that a compression degree may be higher when said detection result by said change detection means indicates that said image is changed exceeding said predetermined criterion, and when said detection result by said change detection means indicates that said image is changed not exceeding said predetermined criterion elapsed by said predetermined time, compressing said image so that the compression degree may become lower, and transmission means of transmitting said compressed image, wherein said compression means comprises a time management means of managing said predetermined time; and
a receiving apparatus including expanding means of expanding said transmitted image utilizing information regarding compression of said image by said compression means, and output means of outputting said expanded image.

12. The image display system according to claim 11, wherein
said transmitting apparatus also serves as said image signal generating apparatus, and
said transmitting apparatus and said image signal generating apparatus are a personal computer.

13. The image processing system according to claim 11, wherein said receiving apparatus is a projector.

14. An image processing method comprising:
change detection step of detecting whether an image to be processed is changed exceeding a predetermined criterion;

compression step including a time management step of managing a predetermined time, wherein the compression step compresses said image so that a compression degree may become higher when a detection result by said change detection step indicates that said image is changed exceeding said predetermined criterion, and when said detection result by said change detection step indicates that said image is changed not exceeding said predetermined criterion elapsed by said predetermined time, compressing said image so that compression degree may become lower; and output step of outputting said compressed image.

15. A recording medium storing a program of causing a computer to function, in the transmitting apparatus according to claim 1, as:

change detection means of detecting whether an image to be processed is changed exceeding a predetermined criterion;

compression means including a time management means of managing a predetermined time, wherein the compression means compresses said image so that a compression degree may become higher when a detection result by said change detection means indicates that said image is changed exceeding said predetermined criterion, and when said detection result by said change detection means indicates that said image is changed not exceeding said predetermined criterion elapsed by said predetermined time, compresses said image so that compression degree may become lower; and output means of outputting said compressed image, wherein said recording medium is computer processable.

16. A transmitting apparatus including change detection means of detecting whether an image to be processed is changed exceeding a predetermined criterion, compression means of compressing said image so that the compression degree of a predetermined rectangular region including the changed region may become higher when a detected result by said change detection means indicates that said image is changed exceeding said predetermined criterion, and when the detected result by said change detection means indicates that said image is not changed exceeding said predetermined criterion, of compressing said image so that a compression degree of a rectangular region including all of said rectangular regions among former images than said image may become lower, output means of outputting said image in the predetermined rectangular region including the changed region when the detected result by said change detection means indicates that said image is changed exceeding said predetermined criterion, and when the detected result by said change detection means indicates that said image is not changed exceeding said predetermined criterion, of outputting said image in said rectangular region including all of said rectangular regions.

17. A transmitting apparatus according to claim 16, wherein said image to be processed is temporarily stored in an image memory, and said change detection means periodically reads said image from said image memory to compare said before and after images, and detects whether said image to be processed is changed exceeding said predetermined criterion.

18. A transmitting apparatus according to claim 16, wherein said predetermined criterion is the number of pixels changed between said before and after images.

19. A transmitting apparatus according to claim 16, wherein said predetermined criterion is used to determine that said image is not changed, if the region where said image is changed is smaller than a predetermined size in area, and is in the same position as the previously detected region where said image is changed.

20. The transmitting apparatus according to claim 16, wherein said compression means compresses said image by changing compression ratio of said image according to a degree of change in said image detected by said change detection means.

21. The transmitting apparatus according to claim 16, wherein during said image is not changed, except for every predetermined period, said compression means does not compress said image and said output means does not output said image, and said compression means compresses said image at every predetermined period and said output means outputs said image at said every predetermined period.

22. The transmitting apparatus according to claim 21, wherein when said predetermined period is repeated for the predetermined number of times or more, said compression means does not compress said image, and when said predetermined period is repeated for said predetermined number of times or more, said output means does not output said image.

23. The transmitting apparatus according to claim 22, wherein when compressing said image at said every predetermined period, said compression means compresses said image to be compressed later at a compression ratio lower than a compression ratio of said image to be compressed earlier.

24. The transmitting apparatus according to claim 16, wherein said image to be processed is one that is generated by an image signal generating apparatus, and said image signal generating apparatus is a personal computer.

25. The transmitting apparatus according to claim 16, wherein for each of a plurality of blocks into which said image that is generated by said image signal generating apparatus is zone-divided, said change detection means detects whether the image to be processed is changed exceeding said predetermined criterion, and for said every block in which said image to be processed is detected to be changed exceeding said predetermined criterion, said compression means compresses said image so that the compression degree of the predetermined rectangular region including said changed region may become higher, and compresses said image so that the compression degree of a region other than said rectangular region may become lower.

26. An image processing system including, an image signal generating apparatus of generating an image, a transmitting apparatus including change detection means of detecting whether the image to be processed, which is generated by said image signal generating apparatus is changed exceeding a predetermined criterion, compression means of compressing said image so that a compression degree of the predetermined rectangular region including said changed region may become higher when the detected result by said change detection means indicates that said image is changed exceeding said predetermined criterion, and when the detected result by said change detection means indicates that said image is not changed exceeding said predetermined criterion, of compressing the image so that a compression degree of a rectangular region including all of the rectangular regions among former images than said image may become lower, and output means of outputting said image in the predetermined rectangular region including said changed region when the detected result by said change detection means indicates that said image is changed exceeding said predetermined criterion, and when the detected result by said change detection means indicates that said image is not changed exceeding said predetermined criterion, of outputting said image in said rectangular region including all of said rectangular regions, a receiving apparatus including expanding means of expanding said transmitted image utilizing information regarding compression of said image by said compression means, and output means of outputting said expanded image.

27. The image processing system according to claim 26, wherein said transmitting apparatus also serves as said image signal generating apparatus, and said transmitting apparatus and said image signal generating apparatus are a personal computer.

28. The image processing system according to claim 26, wherein said receiving apparatus is a projector.

29. An image processing method including, a detection step of detecting whether an image to be processed is changed exceeding a predetermined criterion, a compression step of compressing said image so that a compression degree of the predetermined rectangular region including said changed region may become higher, when the detected result by said change detection means indicates that said image is changed exceeding said predetermined criterion, and when the detected result by said change detection means indicates that said image is not changed exceeding said predetermined criterion, compressing said image so that a compression degree of a rectangular region including all of said rectangular regions among former images than said image may become lower, and an output step of outputting said image in the predetermined rectangular region including said changed region when the detected result by said change detection means indicates that said image is changed exceeding said predetermined criterion, and when the detected result by said change detection means indicates that said image is not changed exceeding said predetermined criterion, outputting said image in said rectangular region including all of said rectangular regions.

30. A recording medium of storing a program of causing the computer to function, in the transmitting apparatus according to claim 16, as:

change detection means of detecting whether an image to be processed is changed exceeding a predetermined criterion, compression means of compressing said image so that a compression degree of the predetermined rectangular region including said changed region may become higher, when the detected result by said change detection means indicates that said image is changed exceeding said predetermined criterion, and when the detected result by said change detection means indicates that said image is not changed exceeding said predetermined criterion, of compressing the image so that a compression degree of a rectangular region including all of said rectangular regions among former images than said image may become lower, output means of outputting said image in the predetermined rectangular region including said changed region when the detected result by said change detection means indicates that said image is changed exceeding said predetermined criterion, and when the detected result by said change detection means indicates that said image is not changed exceeding said predetermined criterion, outputting said image in said rectangular region including all of said rectangular regions, wherein the recording medium is computer processable.

* * * * *